United States Patent [19]

Boehnlein

[11] Patent Number: 5,069,548

[45] Date of Patent: Dec. 3, 1991

[54] FIELD SHIFT MOIRE SYSTEM

[75] Inventor: Albert J. Boehnlein, Ypsilanti, Mich.

[73] Assignee: Industrial Technology Institute, Ann Arbor, Mich.

[21] Appl. No.: 564,104

[22] Filed: Aug. 8, 1990

[51] Int. Cl.$^5$ .............................................. G01B 11/24
[52] U.S. Cl. ................................ 356/376; 250/237 G
[58] Field of Search ............................... 356/374, 376; 250/237 G; 364/562

[56] References Cited

U.S. PATENT DOCUMENTS 4,212,073  7/1980  Balasubramanian ................ 356/376
4,794,550 12/1988  Greivenkamp, Jr. ............... 356/376

FOREIGN PATENT DOCUMENTS 121353 10/1984 European Pat. Off. ............ 356/376

OTHER PUBLICATIONS

Article entitled: "Adaptation of a Parallel Architecture Computer to Phase Shifted Moire Interferometry", By: Albert J. Boehnlein, Kevin G. Harding, Ref.: SPIE vol. 728, Optics, Illumination and Image Sensing for Machine Vision, 1986.
Article entitled: "Moire Interometry for Industrial Inspection", By: Kevin Harding, Ref.: Lasers & Applications, Nov., 1983.
Article entitle: "Heterodyne and Quasi Heterodyne Holographic Interferometry", By: R. Dandiker & R. Thalmann, Ref.: Optical Engineering, Sep./Oct. 1985, Vol. 24, No. 5.
Article entitled: "Digital Phase Shifting Interferometry: a Simple Error-Compensating Phase Calculation Algorithm", By: P. Hariharan, B. F. Oreb, and T. Eiju, Ref.: Applied Optics, vol. 26, No. 13/Jul. 1987.
Article entitled: "Interferometric Measurement of the Roughness of Machined Parts", By: Katherine Creath and James C. Wyant.
Article entitled: "3-D Machine Vision for Automatic Measurements of Complex Shapes", By: G. T. Reid, R. C. Rixon and S. J. Marshall.
Article entitled: "Fringe Shifting in Various Moire Methods", By: F. P. Chiang, Ref.: Exp. Mech. 8(12), 554–560, Dec. 1968.
Article entitled: "Small Angle Moire Contouring", By: Kevin G. Harding, Mark Michniewicz, Albert Boehnlein, Ref.: SPIE Cambridge 87 Meeting, Cambridge, Mass.
Article entitled: "Fringe Pattern Anslysis", By: Albert Boehnlein, Kevin Harding Ref.: SPIE, Aug. 8–9, 1989, vol. 1163.

Primary Examiner—F. L. Evans
Attorney, Agent, or Firm—Harness, Dickey & Pierce

[57] ABSTRACT

An apparatus and method for providing high resolution non-contact absolute contour measurements of an object with moire interferometry. The invention utilizes a projection moire system in which the entire projection system is translated to perform a field shift. The field shift produces a phase shift that is proportional to the height of the object. A coarse three dimensional map of the surface is first obtained from the phase shift. This is combined with high resolution relative measurements of the phase to obtain an absolute Z map of the surface. The invention does not suffer from the $2\pi$ ambiguity problem and is suitable for prismatic discontinuous structures. In addition, the present invention is applicable to industrial environments and requires a relatively inexpensive optical system. Further, the field shifting technique is applicable to fast parallel process computers thereby allowing for fast absolute contour generation of prismatic parts.

8 Claims, 5 Drawing Sheets

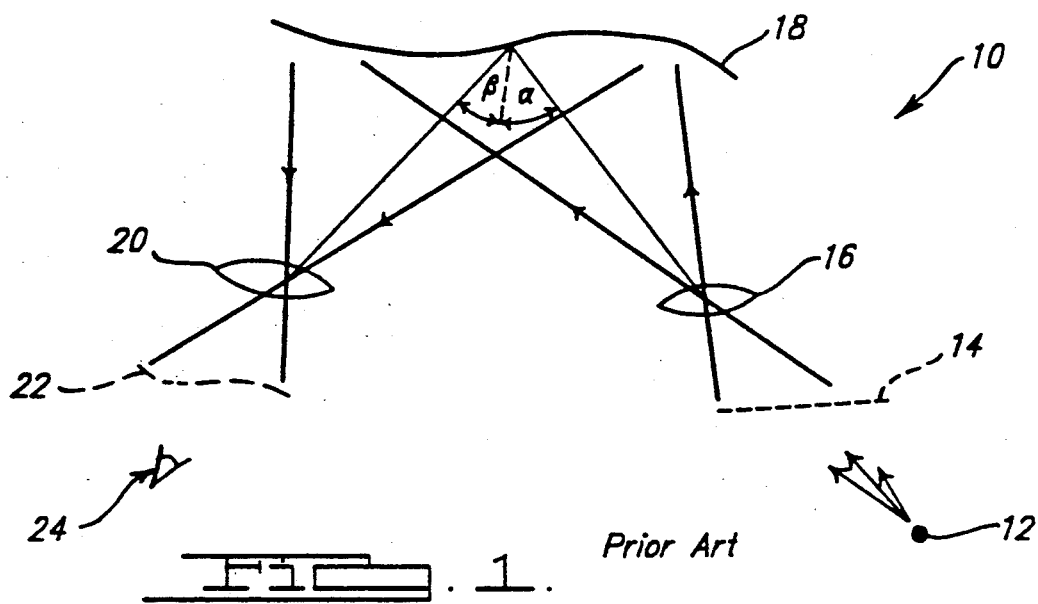
FIG. 1. Prior Art
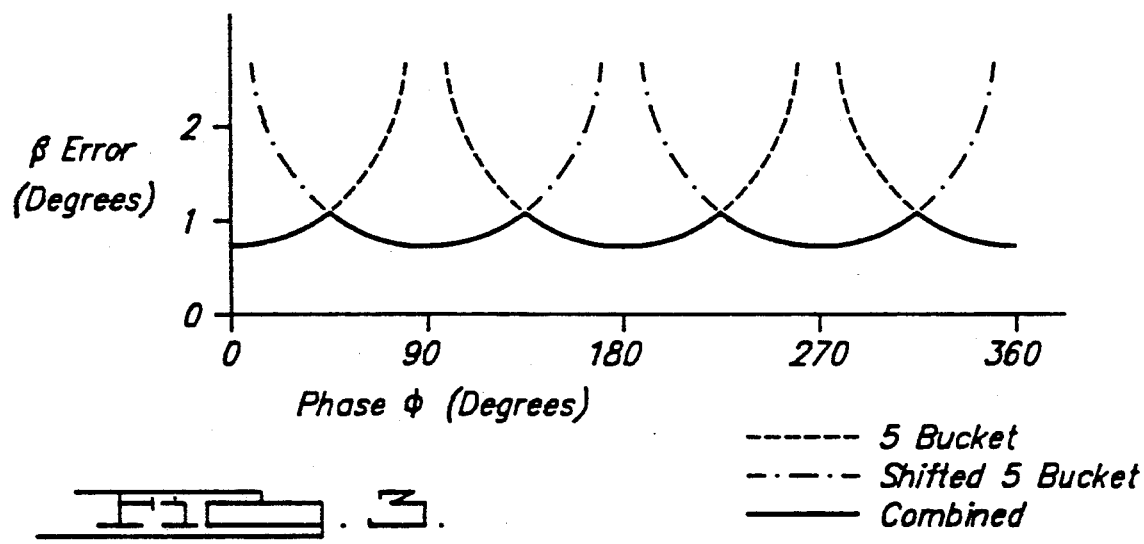
FIG. 3.
| φ (Degrees) | β Algorithm |
| --- | --- |
| 0–45 | Shifted 5 Bucket |
| 45–135 | 5 Bucket |
| 135–225 | Shifted 5 Bucket |
| 225–315 | 5 Bucket |
| 315–360 | Shifted 5 Bucket |
FIG. 4.

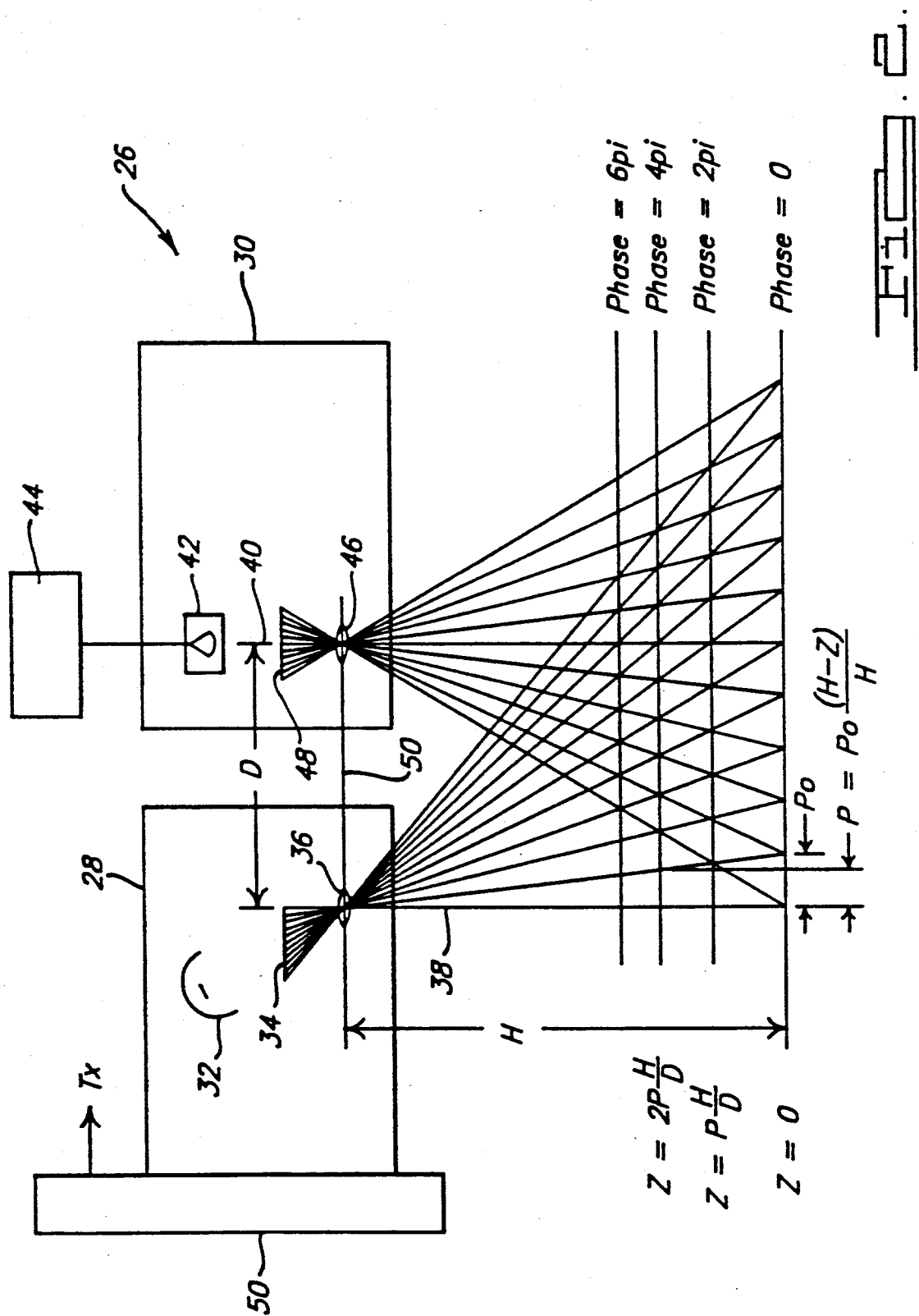

FIELD SHIFT MOIRE SYSTEM

BACKGROUND OF THE INVENTION

1. Technical Field

This invention relates to systems and techniques for providing range measurements, and more particularly to a field shift moire system for providing such measurements.

2. Discussion

Difficulties in processing visual information in three spatial dimensions are encountered in a number of areas and particularly in the field of machine vision. A number of approaches for providing three dimensional machine vision includes structured lighting, range finding, shape from shading and stereo viewing. Structured lighting techniques, while popular because of their simplicity, are time consuming if full three dimensional data is needed, since the surface typically must be scanned to build up the full shape information. Laser range finding systems produce a full three dimensional map but typically must scan over the surface one point at a time to do so. Shape from shading techniques provide the shape information in one video frame by observing the lighting variations which occur due to the varying angle of incidence that directional lighting has on varying surface slopes. Great care must be taken in such techniques to account for variations in the illumination light and variations in surface reflectivity, both of which can produce erroneous data. Stereo viewing techniques triangulate off key points on the part surface, as seen from two different perspectives. However, correlating such points is a difficult task, and if the surface is smooth and featureless, there is nothing to correlate.

While all of the above have their applications, they do have a number of limitations. In particular large computing capacity is often required as well as the requirement of highly skilled operators. Further, these techniques may not be suitable when precision full-field part measurement is required. Without full-field object data some imperfections can be missed altogether in the surface to be analyzed. While coordinate measuring machines can be programmed to measure specific parts, these systems are generally slow and therefore measurements for quality control, for example, are often limited to a spot check system. Thus it would be desirable to have a versatile automated contouring system capable of measuring either large or even small areas at a time to provide the opportunity for better and more complete inspections.

Interferometric techniques have long been used to obtain high resolution, full-field shape information. For example, holographic interferometry provides a very high sensitivity to changes in a structure due to stress, heat, vibrations, flaws, or deformations. However, one of the primary strengths of holographic interferometry, high sensitivity, is also a primary limitation. This is because the amplitudes of the changes being measured are often beyond the upper range of holographic interferometry.

Another full-field non-contact measurement technique, moire interferometry offers many of the testing capabilities of holographic interferometry with an important difference. The sensitivity in moire interferometry can be adjusted to fit the application requirements. As a result, moire interferometry can be very tolerant to positioning errors or extraneous motions. A moire pattern is made by forming a subject grating, by projecting, shadowing, or contacting a grating onto the object to be measured, and comparing this grating to some reference grating by overlaying the two grating images. If the reference grating is a straight line grating, the beat pattern between the two gratings will form a contour map of the object's surface in the same way that a topographical map delineates the contours of land.

One problem that has persisted in moire interferometry over the years has been the lack of ability to obtain an absolute measurement from interferograms with digital heterodyne techniques, such as phase shifting techniques. See Albert J. Boehnlein, Kevin G. Harding "Adaptation of a parallel architecture computer to phase shifted moire interferometry" SPIE volume 728, *Optics, illumination And Image Sensing For Machine Vision*, page 183 (1986), which is hereby incorporated by reference. This problem is due to the fact that a static interferogram suffers from the lack of information to distinguish a hill from a valley. By shifting the phase of the fringe pattern, the sign of a slope can be determined, but there remains an ambiguity when the surface in question has a discontinuous jump. To determine the shape of such a discontinuous or prismatic surface with block structures as part of the shape, the measurement needs to be absolute, not just relative to connecting points.

The reason that one cannot get absolute numbers from the phase shift equations is that the equations rely on the arc-tangent function, which is only continuous over $-\pi/2$ to $\pi/2$. With a two input arc-tangent function, one can determine the quadrant, and therefor the phase over the interval $-\pi$ to $\pi$. The inability to determine the absolute phase is termed the modulo two $\pi$ or two $\pi$ ambiguity problem. With phase shifting it is possible to make relative measurements of the points on the interferogram, provided that the surface has no discontinuities greater than the contour interval.

Thus, it would be desirable to provide a technique for providing absolute range measurements that is a non contact full-field measurement technique. It is further desirable to provide such a technique which does not have the two $\pi$ ambiguity problem. Further, it is desirable to provide a system which is applicable to industrial environments, and which can be applied to fast parallel process computers for fast absolute contour generation of prismatic parts.

SUMMARY OF THE INVENTION

Pursuant to the present invention, a system for measuring or contouring a surface utilizing moire interferometry is provided. The system comprises a projection system including a light source, a master grating and a first lens. The projection system projects a series of lines on the surface. The spacing of the lines is dependent on the distance the surface is from the lens. The further the distance the greater is the separation of the lines. A viewing system, including a means for recording an image, a submaster grating, and a viewing lens is also provided. The viewing system permits the means for recording an image to view the projected lines on the surface through the submaster grating. In this way, the intersection of the projected lines on the surface and the lines on the submaster grating produce moire fringes.

The system also includes a means for translating the projection system in a direction that is parallel to the principle planes of the projection and viewing lenses. The translation of the projection system produces a shift in the position of the contours on the surface at a point, the shift being proportional to the range of the surface at the point. This technique provides both a course absolute measurement and a high resolution relative measurement similar to a vernier caliper. Combining these measurements yield absolute high resolution range information which can be implemented on an eight bit gray scale vision system.

BRIEF DESCRIPTION OF THE DRAWINGS

The various advantages of the present invention will become apparent to one skilled in the art by reading the following specification and by reference to the following drawings in which:

FIG. 1 is a simple projection moire system with a grating projected from the right and viewed from the left through a reference grating in accordance with the prior art.

FIG. 2 is a diagram of the field shift moire system in accordance with the present invention.

FIG. 3 is a plot of error in beta algorithm verses phi.

FIG. 4 is a table of which beta algorithm to use based on phi.

DESCRIPTION OF THE PREFERRED EMBODIMENTS

Figure 5:
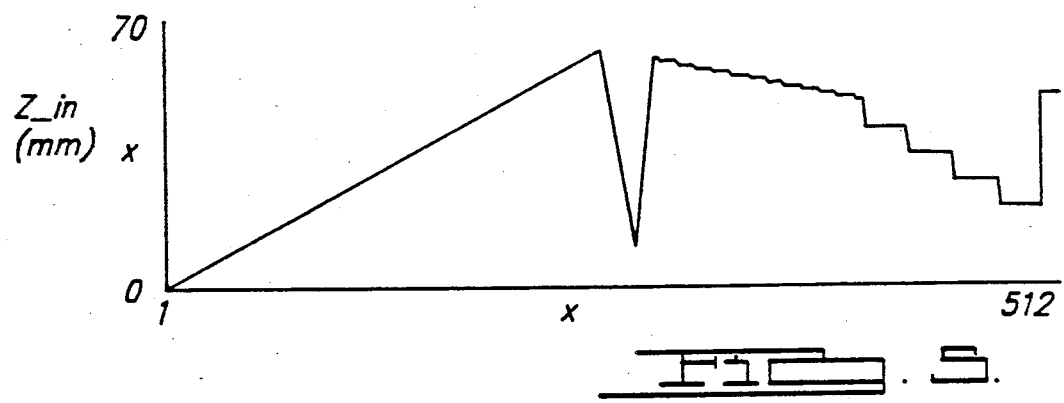
FIG. 5 is a graph of an original Z map surface used in a simulation verses position on the x-axis.

Referring now to FIG. 1, a diagram of a simple conventional moire system 10 is shown. A light source 12 emits light which passes through a master grating 14, and a projection lens 16 to image the grating onto a contoured surface 18. This surface is then imaged back to a reference plane through a second lens 20 and a reference grating 22 where it is seen by a viewer 24. The angle of incidence of the projected grating pattern on the surface 18 is alpha and the viewing angle is designated as beta. The sensitivity of moire contouring is given by the same relationship as other triangulation methods, ie. Z =p/(tan(i) +tan(v)) where p =the grating period on the object
i =the angle of incidence of the projected grating pattern
v =the viewing angle
Z =the sensitivity per fringe.

Since moire is full-field, the contour of an entire area of an object can be mapped out at one time. This allows anomalies as well as large-scale shape features to be viewed and measured to the same precision and at the same point in time. This is important in situations where thermal drifts or other factors may be warping the part with time. Small local anomalies which might be missed using a point by point measurement method will not be missed with a full-field approach, since there are no unmeasured areas. Full-field contouring is inherently much faster than point by point or line by line methods, potentially permitting on-the-fly measurements.

In addition, it should be noted that the reference grating 22 is made by recording the image of the object grating, then the moire pattern can be used to show only differences between the reference or reference state of an object and some new object or state. In this way, moire can be used to show only deviations from a good part. When applied to an on-line inspection system, this difference moire approach greatly reduces the amount of information to be analyzed to determine if a part is within tolerances or to simply identify the part.

The distinct characteristics of moire machine vision make it particularly suitable to many industrial applications, where other systems would have problems. Unlike systems which depend on surface marks or shading affects, moire contouring is very amenable to dirty or hostile manufacturing environments. Many facilities and interferometer manufacturers have incorporated computer systems to digitize and analyze fringe data much like those from moire contouring. Most of these systems however are not made for the type of speed desired for on-line inspection applications. In addition, classical interferometry systems have ambiguity as to the sign of the slopes of the surfaces contoured. This is not important in many optical applications, but is very important in industrial measurements.

The sign of the slope being measured can be determined by a variety of methods. The common technique to use in classical interferometry is to introduce a bias fringe, greater than the slopes encountered, so that all slopes seen have the same sign. This is equivalent to tilting the part in many cases. With moire methods there are other options to determine slope direction such as moving one grating with respect to the other (the fringes will adaptable to fast automation. In phase shifting technique, the fringe pattern is effectively shifted by part of a fringe by moving one of the gratings and known amount, less than one full fringe. The fringes move in a direction determined by the slope of the surface. Three such positions are recorded, and compared to uniquely determine the slopes and depths of the surface. Any features which do not move with the grating, such as the illumination or dark areas on the part do not enter into the result, making this method insensitive to interferences from the environment and surface condition of the part. One limitation of the use of this technique has been the excess computing time associated with comparing the three or more full video frames of information with serial computers. This limitation has been overcome by the work described in the above-referenced paper "Adaptation of a Parallel Architecture Computer to Phase Shifted Interferometry".

A number of digital heterodyne techniques have been developed the process fringe data. In many of these techniques, the intensity of the image at each pixel is assumed to be:

I[x,y]=Io[x,y](1+m[x,y]cos(a[x,y])). Where: I=intensity, I0 is the mean intensity, m is the fringe contrast, a is the phase angle, x is the x coordinate on the point on the model, and y is the y coordinate point on the model. The target variable typically is a [x,y]. This is the phase angle of the fringe which is related to some physical phenomena. The measurements can be anything from displacement and strain fields to density gradients, depending on how the fringe data was formed. In the present invention, the phase angle is a measure of the surface height of an object.

I0[x,y] is the average illumination. The fringe contrast, m[x,y] is a function of the illumination of the image that contributes to the fringes. This quantity is a measure of the quality of the fringes at a specific location on the model surface. If the fringes are washed out, saturated, out of focus, etc., the value of m will decrease and the accuracy of the fringe analysis will be degraded.

While typical phase shifting techniques have many advantages, they still suffer from the above mentioned two $\pi$ ambiguity problem with discontinuous surfaces. Accordingly, in accordance with the present invention, a technique called field shift moire is used to provide non-contact high resolution absolute measurements including both a coarse absolute measurement and a high resolution relative measurement. In general, in accordance with the present invention, a nontelecentric projection moire system is used to project the grating lines onto the object. A similar system is used to image the object onto the reference, or submaster, grating. This is a standard projection moire configuration. In typical phase shift moire, one would translate the projection grating to produce a uniform phase shift in the image. In accordance with the present invention the entire projection system is translated to perform what is a referred to as the "field-shift". Because of the diverging beams in the projector and viewing system, the projected grating changes pitch with distance due to the change in magnification. Therefore, the field shift produces a phase shift that is proportional to the height of the object or Z.

That is, for any given height level on the object, there is a different grating pitch. Since the distance the grating moves at all levels is made constant by the field shift, the ratio of the amount of shift to the pitch, that is, the degrees of phase of the shift, will be unique to each height on the object. This shift effect is in contrast to typical phase shifting, where only the grating is translated producing a uniform phase shift throughout the whole field, independent of Z. Therefore, solving for the phase shift in the field shift method will provide a unique depth associated with any z.

The amount of phase shift imparted in the image during the phase shift procedure is commonly referred to as beta. By solving for beta or the amount of phase shift at a point in the image, we obtain a coarse three dimensional map of the surface that is proportional to Z. The surface need not be continuous as this is an absolute measure. Now we can also solve for the phase phi $\phi$ of the surface and obtain high resolution data with a two $\pi$ ambiguity. Combining these two maps, $\phi$ and $\beta$ with the proper equation results in a map of the $2\pi$ multiplier or absolute fringe order N. Combining the absolute fringe order map in with the phase $\phi$ or fractional fringe map yields an absolute phase map of the surface. Through transformation equations, the absolute phase map $\phi$ is converted to an absolute Z map of the surface.

Referring now to FIG. 2, a diagram of the field shift moire system in accordance with the present invention is shown. The field shift moire system 26, includes a projection system 28 and a viewing system 30. The projection system 28 includes a light source 32, a master grating 34 and a lens 36. The projection system 28 is modeled as pin hole system located a distance D from the viewing system with principle ray 38 (the ray passing through the center of lens 36) parallel to the Z or vertical axis. The viewing system 30 is also modeled as a pin hole system, with the principle ray 40 parallel to the Z axis. d is defined as the distance between the projection system principle ray 38 and the viewing system principle ray 40.

The light source 32 may comprise for example a lamp and focusing optics. The viewing system 30 also includes a camera 42 which may include a video camera or other means of recording the image. The camera 42 may also be connected to a programmable processor 44 for performing analysis of the resulting image. In addition, the viewing system 30 includes a lens 46. The projection system lens 36 may be for example a 35 focal length lens f13, and the viewing system lens 46 may be a 35 mm focal length lens with f/3. A suitable grating 34 may be a chrome on glass grating 34 with 200 lines per inch. The viewing system also includes a submaster grating 48 which may, for example, be made photographically to subtract out the effects of aberrations or misalignments in the optical systems.

The projection system 28 also includes a translation system 50 which is used to produce the desired field shifts by translating the entire projection system as a unit mechanically. For example, translation 50 may comprise a precision motorized micrometer driving a translation stage. For example, a suitable micrometer may read out tenths of a micron with a repeatability of .02 microns.

The processor 44 used to process information may be for example, an AIS 5000 manufactured is Applied Intelligent Systems Inc. This system has a massively parallel type architecture which enables the computer to process large amounts of information very rapidly. With the full complement of processing cards, the system is capable of three billion bit-level operation per second. This is important to the near real-time processing of moire fringes, since multiple images of up to one half megabyte, each must be processed simultaneously.

The principle plane 50 of the projection system 28 is the same as the viewing system 30. If the principle plane of the viewing and projection systems are not the same then there are additional linear affects which must be dealt with using conventional techniques. At a distance h from the principle plane 50 of the projector 28 and viewing system 30 is the plane z=0. The pitch of the projected grating at z=0 is Po. Also, at z=0, the phase equals zero. FIG. 2 also indicates that the phase at $$z = \frac{PH}{D},$$

equals $2\pi$, at $$z = \frac{2PH}{D},$$

equals $4\pi$ and so on. By similar triangles the pitch of the grating at other points is a function of Z such that:

$$P = Po * \frac{(H - Z)}{H} \qquad (1)$$

The phase is shifted by translating the projector in the X direction in amount Tx. The amount of phase shift, or $\beta$ for a given translation "tx" is:

$$\frac{\beta}{2\pi} = \frac{Tx}{P} = \frac{Tx}{Po} * \frac{H}{(H - Z)} \qquad (2)$$

From FIG. 2, it can be seen that the relationship between Z and $\phi$ can be expressed as:

$$Z = \frac{\phi}{2\pi} P \frac{H}{d} = \frac{\phi}{2\pi} P_o \frac{(H-Z)}{d} \tag{3}$$

Solving for Z in equation (3), we get:

$$Z = \frac{H \frac{\phi}{2\pi} \cdot \frac{P_o}{d}}{\left[1 + \frac{\phi}{2\pi} \cdot \frac{P_o}{d}\right]} \tag{4}$$

and solving for $\phi$ we get:

$$\frac{\phi}{2\pi} = \frac{d}{P_o} \cdot \frac{Z}{(H-Z)} \tag{5}$$

When the projector system is translated Tx, the distance d is changed a like amount. This results in a change of phase, as defined by equation (5). Using the intensity equation discussed above we can calculate the Intensity for six different field shifts. The actual intensity values for the six images is:

$$I_1 = I \cdot (1 + c \cdot \cos(\phi_1 - 2\beta)) \tag{6a}$$

$$I_2 = I \cdot (1 + c \cdot \cos(\phi_2 - \beta)) \tag{6b}$$

$$I_3 = I \cdot (1 + c \cdot \cos(\phi_3)) \tag{6c}$$

$$I_4 = I \cdot (1 + c \cdot \cos(\phi_4 + \beta)) \tag{6d}$$

$$I_5 = I \cdot (1 + c \cdot \cos(\phi_5 + 2\beta)) \tag{6e}$$

$$I_6 = I \cdot (1 + c \cdot \cos(\phi_6 + 3\beta)) \tag{6f}$$

Where:

$$\phi_1 = 2\beta = 2\pi \frac{(d-2Tx)}{P_o} \cdot \frac{Z}{(H-Z)} - 2\beta \tag{7}$$

$$\phi_2 = \beta = 2\pi \frac{(d-Tx)}{P_o} \cdot \frac{Z}{(H-Z)} - \beta \tag{8}$$

$$\phi_3 = 2\pi \frac{d}{P_o} \cdot \frac{Z}{(H-Z)} \tag{9}$$

$$\phi_4 + \beta = 2\pi \frac{(d+Tx)}{P_o} \cdot \frac{Z}{(H-Z)} + \beta \tag{10}$$

$$\phi_5 + 2\beta = 2\pi \frac{(d+2Tx)}{P_o} \cdot \frac{Z}{(H-Z)} + 2\beta \tag{11}$$

$$\phi_6 + 3\beta = 2\pi \frac{(d+3Tx)}{P_o} \cdot \frac{Z}{(H-Z)} + 3\beta \tag{12}$$

Since the change in $\phi$ with respect to the phase shift is proportional to the phase shift $\beta$, we can redefine $\phi$ and $\beta$ to move the varying term from $\phi$ to $\beta$. First we must separate the constant term related to the period from the changing term containing Tx:

$$\phi_i = 2\pi \frac{(d + (i-3)Tx)}{P_o} \cdot \frac{Z}{(H-Z)} \tag{13}$$

After redefining $\phi$ and $\beta$, we get:

$$\phi = 2\pi \frac{d}{P_o} \cdot \frac{Z}{(H-Z)} \tag{15}$$

$$\phi_i = 2\pi \frac{d}{P_o} \cdot \frac{Z}{(H-Z)} + 2\pi \frac{(i-3)Tx}{P_o} \cdot \frac{Z}{(H-Z)} \tag{14}$$

And:

$$\beta = 2\pi \frac{Tx}{P_o} \cdot \frac{H}{(H-Z)} + 2\pi \frac{Tx}{P_o} \cdot \frac{Z}{(H-Z)} \tag{16}$$

Which reduces to:

$$\beta = 2\pi \frac{Tx}{P_o} \cdot \frac{(H+Z)}{(H-Z)} \tag{17}$$

Rewriting equation (17) in terms of Z yields:

$$Z = H \frac{\left[P_o \cdot \frac{\beta}{2\pi} - Tx\right]}{\left[P_o \cdot \frac{\beta}{2\pi} + Tx\right]} \tag{18}$$

Now using equations (4) and (18) we can state the relationship between $\phi$ and $\beta$ as:

$$H \frac{\left[P_o \frac{\beta}{2\pi} - Tx\right]}{\left[P_o \frac{\beta}{2\pi} + Tx\right]} = H \frac{\frac{\phi}{2\pi} \cdot \frac{P_o}{d}}{\left[1 + \frac{\phi}{2\pi} \cdot \frac{P_o}{d}\right]} \tag{19}$$

Solving for $\phi$, we get:

$$\phi = d \frac{(P_o \beta - 2\pi Tx)}{2 P_o Tx} \tag{20}$$

We rewrite the $\phi$ as:
$$\phi = 2\pi N + \phi' \tag{21}$$

Where N is the unknown integer portion of the phase and $\phi'$ is the fractional, or modulo $2\pi$ part. Substituting the expression for $\phi$ in equation (20) and solving for N we get the exact solution of the relationship of $\phi'$, $\beta$ and N:

$$2\pi N = d \cdot \frac{(P_o \beta - 2\pi Tx)}{2 P_o Tx} - \phi' \tag{22}$$

The performance of the equations, may be tested by using a computer simulation. To simulate 8 bit grey scale, the range of intensity was set to an integer limited to the range of 0–256. To further simulate 8 bit scale, 2 bits of random noise was added to the signal. The data presented here was generated using the following values:

d = 50 mm
H = 400 mm
Po = 1 mm
Tx = 0.20 mm
c = 0.5
I = 128

Where c is the contrast ratio of fringes which is a constant for a given point on the surface.

The contour interval (that is, the height difference between the phase $=2\pi$, $4\pi$, ect levels) of the simulation at the plane $Z = 0$ is:

$$CI_o = P_o \cdot \frac{H}{d} = 1 \cdot 400/50 = 8 \text{ mm} \tag{23}$$

Values of $\beta$ and $\phi$ relating to the Z map were generated via equations (2) and (7-11). Intensity values were generated via equations (6a-6f). The equation to extract $\phi'$ is:

$$\tan(\phi) = \frac{2*(I_2 - I_4)}{(2*I_3 - I_5 - I_1)} \qquad (24)$$

This is commonly referred to as the 5 bucket algorithm because it uses 5 images to determine $\phi$. This algorithm was chosed because it is not sensitive to small changes in beta. Two different equations are used to calculate $\beta$, based on $\phi$. The two equations based on the 5 bucket algorithm, with the first one using the first 5 buckets, and the second (shifted) using buckets 2-6.

$$\cos(\beta) = \frac{I_5 - I_1}{2*(I_4 - I_2)} \qquad (25)$$

$$\cos(\beta) = \frac{I_6 - I_2}{2*(I_5 - I_3)} \qquad (26)$$

The use of 6 images, with a shift of one image for the two equations, is necessary because the denominator in equation (25) goes to zero under certain conditions. The proper equation to use, based on $\theta$, to minimize error was determined experimentally. FIG. 3 shows the comparison of the maximum error of the two different algorithms for 5000 random inputs of $\beta$ and $\phi$. The range of $\beta$ is 85 to 95 degrees, the range of $\phi$ is 0 to 360 degrees. To simulate actual camera input, equations (6a)-(6f) were used to generate intensity values. The contrast was set at 0.5, the intensity values were rounded, and 2 bits of random noise was added as noted earlier. Based on the graph, the rule in FIG. 4 was developed.

Figure 6:
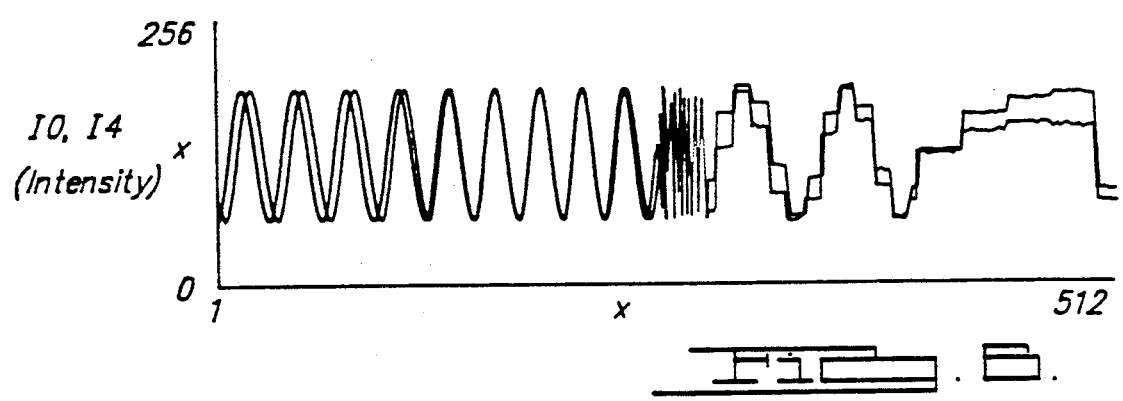
FIG. 6 is a plot of the raw eight bit intensity signal for $I_0$ and I4.
Figure 7:
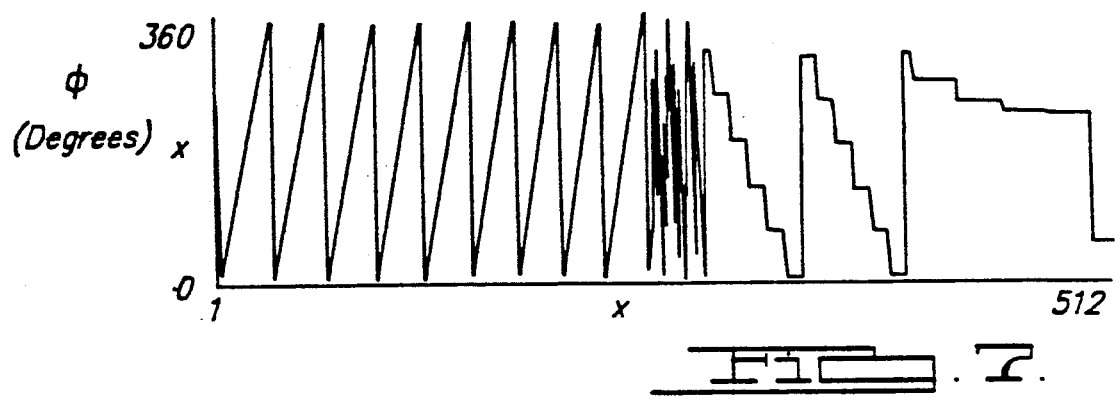
FIG. 7 is a plot of fractional phase phi verses X.
Figure 8:
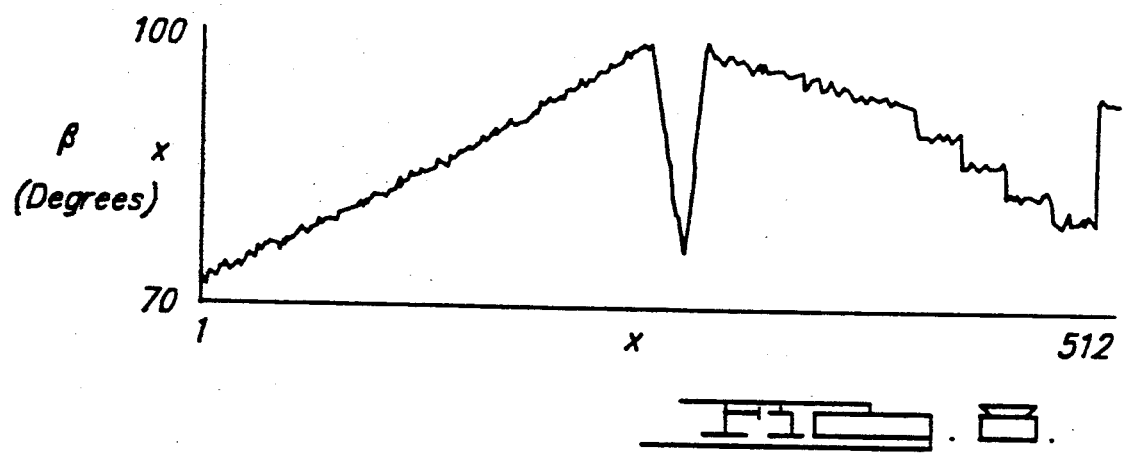
FIG. 8 is a plot of phase shift beta verses X.
Figure 9:
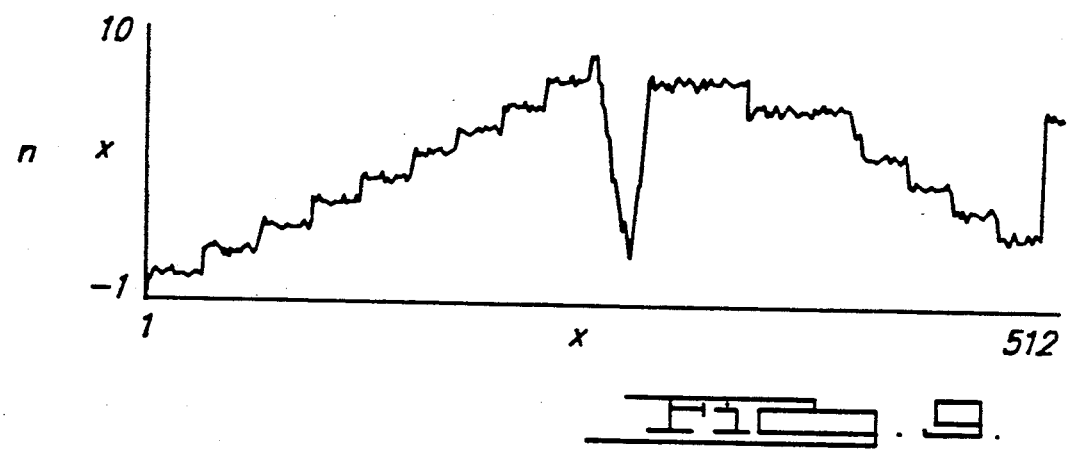
FIG. 9 is a plot of fringe number n before rounding verses x.
Figure 10:
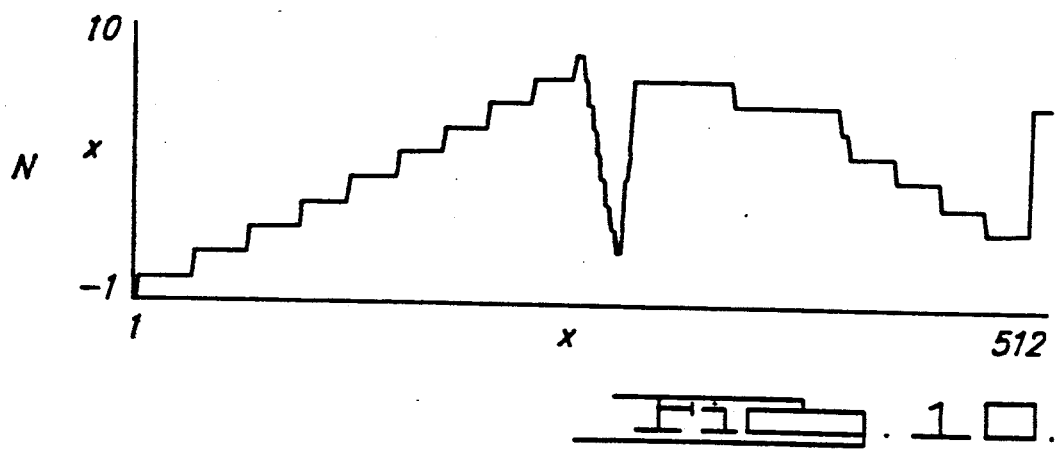
FIG. 10 is a plot of fringe number N after rounding verses x.
Figure 11:
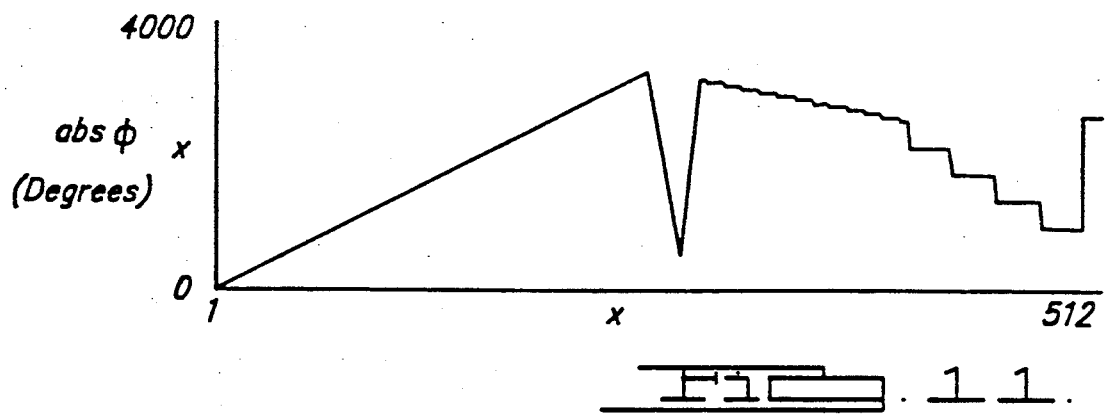
FIG. 11 is plot of absolute phase phi verses x.
Figure 12:
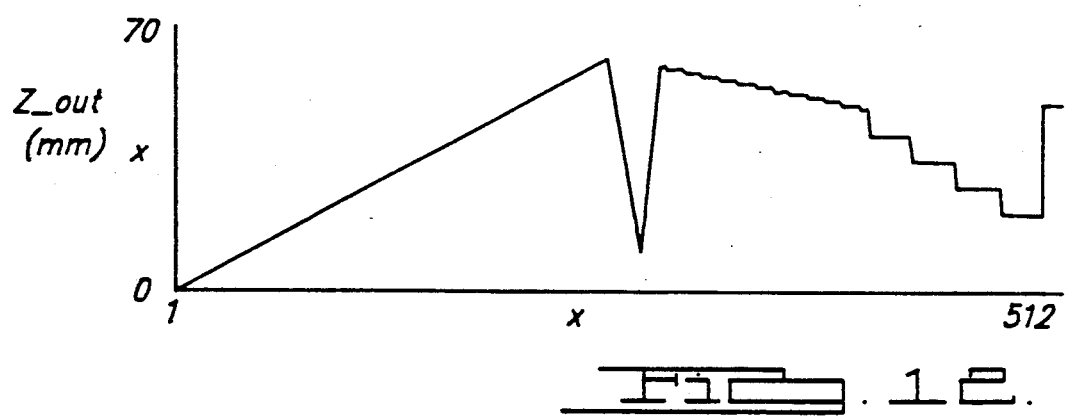
FIG. 12 is a plot of reconstructed Z in millimeters verses x.
Figure 13:
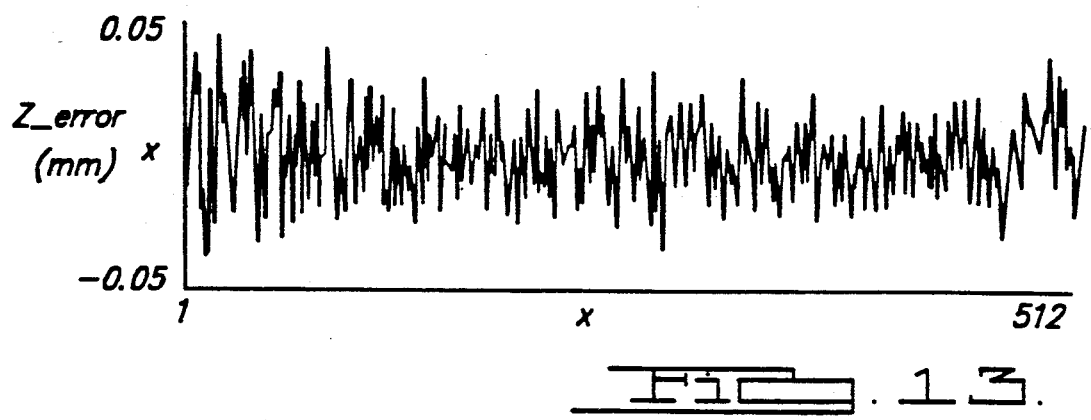
FIG. 13 is a plot of error in Z in millimeters verses x.

The output of the simulation in FIGS. 5-13. FIG. 5 is the profile of the original surface. This test surface contains extremely steep slopes and discontinuities that would normally be a problem to analyze. FIG. 6 is the intensity image of bucket $I_0$ and $I_4$ for the interferogram generated from equations (6a)-(6f). As can be seen from the figure, there is a change in phase shift or $\beta$ with height in Z. Where, the two curves overlap, $\beta=90$ degrees. FIG. 7 is the fractional phase map $\phi'$ of the surface. This map was constructed using equation (24). Notice the 2 $\pi$ ambiguities. FIG. 8 is the $\beta$ map of the surface. The $\beta$ map is somewhat noisy, but follows the shape of the part, with no gaps or discontinuities. FIG. 9 is the fringe order number N, obtained from equation (22). FIG. 10 is the integer fringe order number N after the rounding process. FIG. 11 is the absolute phase map of the surface. This is the result of the combination of the integer fringe order number N and the phase map $\phi$ per equation (21). FIG. 12 is the resultant Z map of the surface from equation (3). FIG. 13 is the deviation from the original Z map of the model. Equation (22) predicts the fringe order number fairly well although it is very noisy. The reason it works so well can be found in the round off function, where N is converted from a real number to an integer. If $\beta$ is too noisy, which occurs at lower contrast and smaller contour intervals, then the rounding process may produce an error. There are several possible solutions to this problem. One can run some sort of smoothing filter to reduce the noise on the signal. One can also increase the ratio of the change in $\beta$ verse the fringe order. The derivative of the $\beta$ with respect to $\phi$ is:

$$\frac{d\beta}{d\phi} = \frac{Tx}{d} \qquad (27)$$

This relationship between $\beta$ and $\phi$ implies that an increase in the shift from 90 degrees to 360 degrees to 360 +90 degrees would reduce the error. This has the effect of increasing the change in s per fringe order. There is a problem however, with too great a change in $\beta$, because the five bucket algorithm has an increasing error in $\phi$ as $\beta$ moves farther from 90 degrees. Using a 120 degree shift algorithm and changing the nominal $\beta$ from 90 to 120 degrees would also help. The problem associated with too great a change in $\beta$ can be solved by using the four bucket $\beta$ compensated algorithm which is less sensitive to changes in $\beta$ and has a minimum error at $\beta=120$ degrees. Since Tx is a function of Po, (Tx =0.25*Po for 90 degree shift), we can rewrite the derivative of $\beta$ with respect to $\phi$:

$$\frac{d\beta}{d\phi} = \frac{Po}{d} \qquad (28)$$

This implies that a system with a large contour interval will perform better than a more sensitive system with a small contour interval for a given standoff distance H.

In a real moire setup, when the projector is shifted, the point on the model surface will receive light from a different part of the light source. This change in lighting must be minimized, as the algorithms are sensitive to changes in the background lighting and fringe contrast, if they occur between exposures.

The B algorithms are also sensitive to the true shape of the fringes. For the best results, the fringes must be of a sinusoidal nature. Problems may occur if the fringes are formed from square wave gratings, or the camera that records the image does not have a highly linear response.

When implementing the field shift setup, one must know the pitch of the grating, Po at Z =0. This can be determined by solving equation (2) for Po at Z =0 and measuring $\beta$:

$$Po = \frac{2\pi}{\beta} Tx \qquad (29)$$

One can run into problems if Po is not constant, but rather changes over the field due to the keystone affect, barrel distortion, and other aberrations. These errors can be compensated for by solving for and storing the value of Po for every pixel. Such a pixel map of Po can be made during a system calibration by placing a flat plane at the Z =0 plane, measuring $\beta$ at every point, and calculating Po for every pixel.

This technique may also be extended to other forms of interferometry, provided a means of shifting the field and a dependence of $\beta$ on the function being measured can be established. One side benefit of the field shifting algorithm is that is an inherently parallel process. This indicates that extremely high computation rates can be achieved by implementing the algorithm on a parallel processor.

The present invention provides a system and technique to produce absolute phase and z (depth) information from a moire system. This technique may also be applicable to other forms of phase shift interferometry for such possible applications as absolute analysis of temperature, pressure, deformation, and thickness using well known, non-invasive, interferometric techniques. The present invention is useful for contouring difficult to analyze objects which include discontinuous jumps in the surface. The field shifting technique in accordance with the present invention also has the advantage of being applicable to fast parallel process computers, thereby allowing for fast absolute contour generation of prismatic parts.

Those skilled in the art can appreciate that other advantages can be obtained from the use in this invention and that modification can be made without departing from the true spirit of the invention after studying the specification, drawings, and following claims.

What is claimed is:

1. A moire interferometry system for measuring the range of points on a contoured surface, said system comprising:
    a projection system including a light source, a master grating, and a first lens having a principle plane generally perpendicular to said surface, said projection system projecting a series of diverging lines on said surface;
    a stationary viewing system including a means for recording on image, a submaster grating having lines, and a second lines having a principle plane generally perpendicular to said surface, said means for recording an image disposed so as to view said projected lines on said surface through said submaster grating, wherein the intersection of said projected lines on said surface and said lines on submaster grating produces moire fringes; and
    means for translating the projection system, said translation being in a direction perpendicular to the principle planes of the projection and viewing lenses, wherein the translation of said projection system produces a shift in the position of said moire fringes on said surface at a point, said shift being proportional to the range of said surface at said point.

2. The moire interferometry system of claim 1 wherein said light source, master grating and projection system are in fixed relation to each other.

3. The system of claim 1 further comprising a processor means for calculating a phase shift $\beta$ at selected points on said surface caused by translation of said projection system by said translation means, said phase shift $\beta$ resulting in a course three dimensional map of the surface that is proportional to the height of said surface (Z).

4. The system of claim 3 wherein said processor means further comprises means for determining the phase $\phi$ of said surface at said selected points, whereby a high resolution phase map is obtained without two pi ambiguity.

5. The system of claim 4 wherein said processor means further comprises a means for combining the phase shift $\beta$ and phase maps to construct a map of the absolute fringe order N of said moire fringes.

6. The system of claim 5 wherein said processor means further comprises a means for combining the absolute fringe order map with the phase map to construct an absolute phase map of the surface, and a means for converting the absolute phase map to an absolute Z map of the surface.

7. A moire interferometry system for measuring the range of points on a contoured surface, said system comprising:
    a projection system including a light source, a master grating, and a first lens, said projection system projecting a field of diverging projecting lines on said surface;
    a stationary viewing system including a means for recording an image, a submaster grating having lines, and a second lens, said viewing system permitting said means for recording an image to view said projected lines on said surface through said submaster grating, the intersection of said projected lines on said surface and said lines on submaster grating produces moire fringes; and
    means for translating the field of lines projected from said projection system generally in a direction perpendicular to a line normal to said surface, wherein said change in said distance produces a shift in the position of said moire fringes on said surface at a point, said shift being proportional to the range of said surface at said point.

8. A method for measuring the range of points on a contoured surface, said system comprising the steps of:
    projecting a field of diverging lines on said surface;
    viewing said lines through a grating, wherein the intersection of said projected lines and said grating produces moire fringes; and
    translating the projected field of lines in a direction generally perpendicular to the direction of said diverging lines, wherein the translation produces a shift in the position of said moire fringes on said surface at a point, said shift being proportional to the range of said surface at said point.

* * * * *

UNITED STATES PATENT AND TRADEMARK OFFICE
CERTIFICATE OF CORRECTION

PATENT NO. : 5,069,548

DATED : December 3, 1991

INVENTOR(S) : Albert J. Boehnlein

It is certified that error appears in the above-identified patent and that said Letters Patent is hereby corrected as shown below: Item [56], ON THE TITLE PAGE under OTHER PUBLICATIONS, second column, line 13, after "Article Entitled: 'Fringe Pattern" delete "Anslysis" and insert --Analysis--.

Column 7, line 38, after "$\emptyset_1$" delete "=" and insert - - -.

Column 7, line 40, after "$\emptyset_2$" delete "=" and insert - - -.

Column 11, line 25, Claim 1, delete "on" and insert --an--.

Column 11, line 26, Claim 1, delete "lines" and insert --lens--.

Column 12, line 30, Claim 7, delete "produces" and insert --producing--.

Column 12, line 32, Claim 7, after "system" delete "generally in a direction" and insert --in a direction generally--.

Column 12, line 39, Claim 8, delete "system" and insert --method--.

Column 12, line 42, Claim 8, delete "intersection" and insert --intersections--.

Signed and Sealed this

Eleventh Day of January, 1994

*Attest:*

BRUCE LEHMAN

*Attesting Officer*     *Commissioner of Patents and Trademarks*